United States Patent Office 2,794,319
Patented June 4, 1957

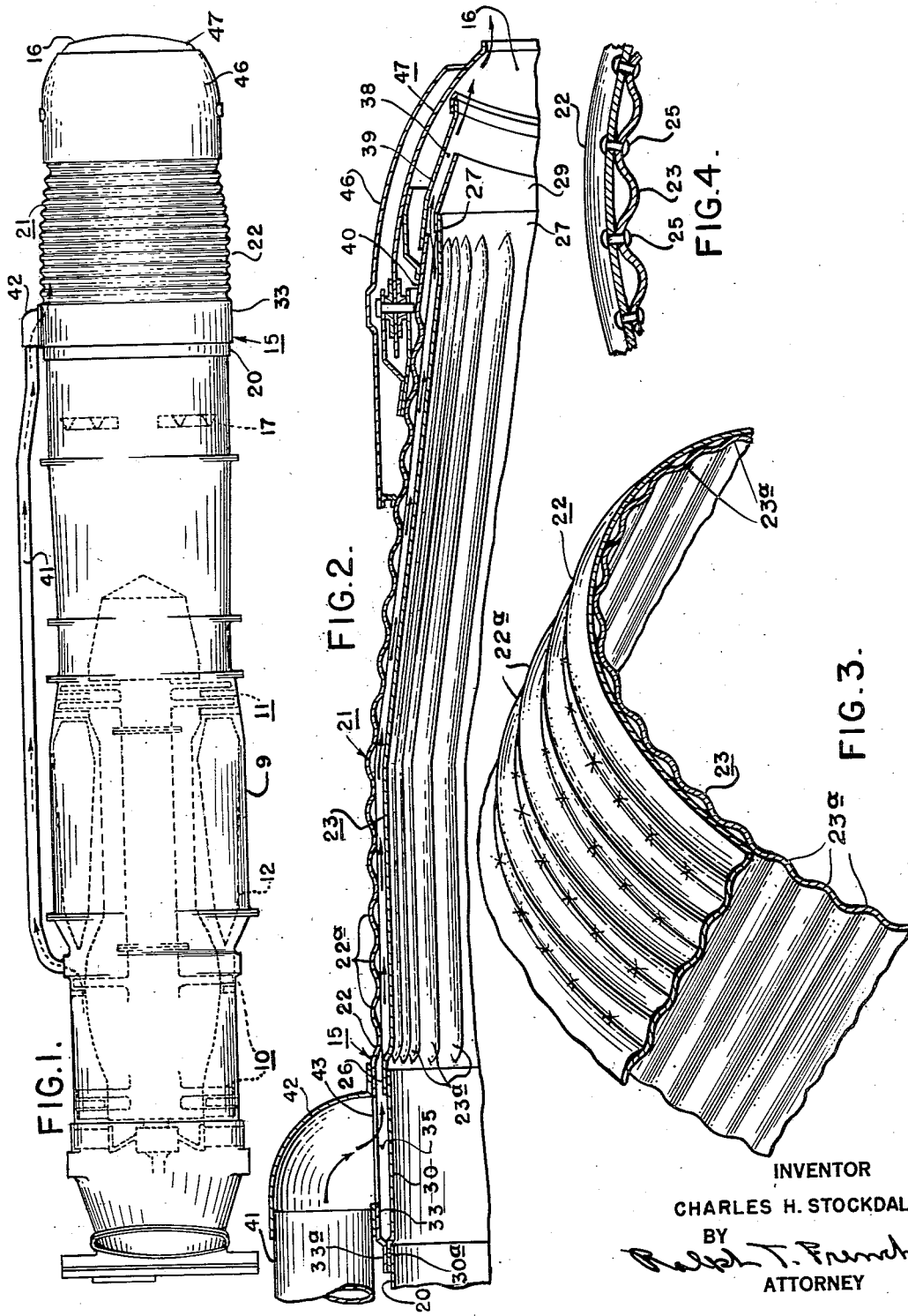

2,794,319

AFTERBURNER SHELL CONSTRUCTION

Charles H. Stockdale, Springfield, Pa., assignor to Westinghouse Electric Corporation, East Pittsburgh, Pa., a corporation of Pennsylvania Application March 2, 1953, Serial No. 339,505

6 Claims. (Cl. 60—35.6)

This invention relates to aviation jet propulsion power plants, particularly to afterburner apparatus for augmenting the thrust of such a power plant.

It has been proposed to increase the available thrust at the nozzle of a turbojet, athodyd or the like, by providing an afterburner which can be operated to burn fuel in the stream of exhaust gases and residual air immediately upstream of the nozzle. A conventional afterburner for a turbojet power plant may comprise two plain, sheet metal cylinders having a common centerline, one cylinder being slightly larger than the other and encasing it to provide a space through which part of the exhaust gases is conducted, by-passing the afterburning zone, for cooling purposes. Usually the outer cylinder of such an afterburner constitutes the structural supporting member, while the other serves merely as a heat radiation shield and shroud to contain the hotter gases. It is an object of the invention to provide improved afterburner apparatus having double corrugated wall structure.

Another object of the invention is to provide an improved double corrugated wall structure for an afterburner, which is adapted to contribute favorable weight and heat resisting characteristics not heretofore obtainable.

A further object of the invention is to provide an afterburner casing structure comprising telescoped inner and outer cylindrical shells, the inner shell being corrugated longitudinally between smooth annular marginal ends, and the outer shell being corrugated circumferentially between smooth annular ends thereof and secured to the inner shell at the abutting areas of the respective corrugations.

It is also an object of the invention to provide an improved turbojet afterburner of the foregoing double corrugated shell construction, having a manifold formed at the upstream end which is adapted to receive air tapped from the usual compressor for distribution through the space formed between the inner and outer shells.

These and other objects are effected by the invention as will be apparent from the following description taken in connection with the accompanying drawing, forming a part of this application, in which:

Fig. 1 is a longitudinal diagrammatic view of a typical aviation turbojet power plant having afterburner apparatus constructed in accordance with the invention;

Fig. 2 is a fragmentary enlarged detail view, in section, of a portion of the afterburner structure shown in Fig. 1;

Fig. 3 is a fragmentary perspective view of a portion of the afterburner structure shown in Fig. 2; and Fig. 4 is a fragmentary enlarged detail sectional view of the same afterburner structure, illustrating securing means for locking the inner and outer shell sections together.

As shown in Fig. 1, the typical aviation gas turbine or turbojet power plant comprises a generally cylindrical engine casing structure 9 having mounted therein an axial-flow compressor 10, a gas turbine 11 for driving the compressor, and annular combustion apparatus 12 which burns fuel in air from the compressor for conversion into hot gases, some of the energy of which is utilized in motivating the turbine. Cylindrical afterburner apparatus 15 is coaxially connected to the engine casing structure 9 on the downstream or exhaust side of the turbine. The afterburner apparatus 15 terminates in the usual variable area nozzle 16. When the available thrust of the power plant is to be increased over that normally provided by motive gases and residuary air discharged from the turbine through the nozzle 16, additional fuel is burned in this fluid stream as it passes through the afterburner apparatus, such fuel being preferably introduced by way of nozzles (not shown) associated with a suitable flame holder 17.

According to the invention, as best shown in Fig. 2, the afterburner apparatus includes a relatively smooth cylindrical envelope section 20 and double corrugated casing structure generally indicated at 21, which may be carried in cantilevered relation on the downstream end of the envelope section 20. The double corrugated casing structure 21 which is partly cylindrical and partly tapered, comprises an outer shell 22 having a plurality of circumferential annular corrugations 22a formed throughout the major extent thereof, and an inner shell 23, which has an array of longitudinal corrugations 23a extending through the major portion of its length. The two cylindrical shells are so proportioned that when telescoped together, the outer elevated surfaces of the longitudinally corrugated inner shell are snugly engaged by the innermost surfaces of the annular corrugations of the outer shell. At these abutting points of crossing of the respective corrugations, suitable fastening means may be provided, such as bolts or rivets 25 as shown in Fig. 4. If preferred, the shells may be electrically resistance-welded or spot welded at these points of contact, as indicated in Fig. 3. It will be noted that both of the assembled shells have the same rearwardly tapered or conical conformation in the region of the nozzle 16.

The longitudinal corrugations 23a merge into smooth circular opposite end portions or margins 26 and 27 of the inner shell 23. The downstream margin 27 of the inner shell 23 has welded thereon a frusto-conical flange element 29. The larger upstream margin 26 is welded to an annular casing section 30 that has an offset flange 30a welded to the casing section 20. A smooth circular margin 33 formed on the upstream end of the outer shell 22 is spaced concentrically about the casing section 30 to form an annular cooling air receiving chamber 35, the forward end of which is closed by a welded joint between the flange 30a and a complementary terminal flange 33a of the outer shell.

The chamber 35 communicates with the nozzle 16, through the annular network of passages or tortuous flow paths formed between the corrugated outer and inner shells and an annular outlet 38. The latter is formed between the flange element 29 of the inner shell and an overhanging flange element 39 welded to a smooth conical terminal margin 40 of the outer shell 22. For supplying cooling air to the chamber 35, a conduit 41 is connected to the usual discharge passage of the compressor 10 (see Fig. 1) and to an elbow section 42 carried by the outer shell margin 33 adjacent a suitable opening 43 therein.

Mounted on the nozzle end of the double corrugated casing structure 21 of the afterburner 15 is a housing 46 for an adjustable nozzle flow area controlling assembly, generally indicated at 47, which may be of any conventional construction, and is limited in radial extent to lie within the maximum lateral dimensions of the engine envelope.

Summarizing, it will be seen that the cross-corrugated double shell afterburner structure is rigid in exactly the ways it needs to be rigid, and is flexible in the ways in which it needs to be flexible. When the inner shell tends to expand longitudinally more than the outer shell because of differential temperatures, the corrugations of the outer shell provide an accordion effect which allows the inner shell to grow in length while the corrugations of the outer shell simply increase slightly in pitch to accommodate. When the inner shell tends to expand to a larger diameter than that of the outer shell (because the outer shell is the cooler during afterburner operating) no harmful effects result. The corrugations of the inner shell merely become deeper and prevent application of undue stress forces against the outer shell. With the improved combination of the oppositely corrugated shell elements, mechanical problems of supporting one shell by the other and locating it accurately with respect thereto are minimized. The concentric shells when secured together at the points of crossing of the respective corrugations constitute a better vibration damping arrangement than previous afterburner constructions. In addition, the inner shell is rendered more resistant to any tendency to collapse, since it is so intimately connected to and supported by the outer shell in the manner described. Efficient cooling of the afterburner structure is ensured by supply of air directly from the compressor outlet, thereby eliminating the necessity of providing a conventional ejector means as heretofore required.

While the invention has been shown in but one form, it will be obvious to those skilled in the art that it is not so limited, but is susceptible of various changes and modifications without departing from the spirit thereof.

What is claimed is:

1. In afterburner apparatus for a turbojet engine, an annular engine envelope section enclosing a motive gas passage, a pair of concentric outer and inner annular casing sections having abutting annular flanges secured to said envelope section, said pair of casing sections forming an annular passage having a lateral inlet for receiving cooling air, said passage being disposed adjacent said motive gas passage, a cylindrical inner shell extending from the inner of said pair of casing sections and forming an afterburning passage communicating at the upstream end with said motive gas passage and terminating at the opposite end in a jet nozzle, said inner shell having a plurality of longitudinally extending corrugations formed therein, the outer of said pair of casing sections being elongated to constitute an outer shell enveloping said inner shell, said outer shell having formed therein a plurality of annular corrugations disposed normal to said corrugations in the inner shell, means securing said shells together at a plurality of the abutting areas of their respective corrugations, said shells forming an annular network of passages communicating with said annular cooling air passage, and means forming an outlet for said network of passages in communication with said jet nozzle.

2. Heat-resistant cylindrical casing structure for a jet propulsion power plant, comprising a cylindrical inner shell forming a combustion gas flow passageway and having a discharge nozzle, said inner shell having a plurality of circumferentially spaced, longitudinally extending corrugations formed parallel to the axis of the casing structure, a cylindrical outer shell surrounding said inner shell and having a plurality of annular corrugations formed therein normal to said corrugations in said inner shell, said outer shell engaging said inner shell as the spaced points of crossing of the recessed surfaces of said annular corrugations of the outer shell and the elevated portions of said longitudinal corrugations of the inner shell, means securing together a plurality of such engaging portions of the respective inner and outer shells, said corrugated shells being spaced apart at other points to provide an annular array of intercommunicating flow spaces disposed adjacent said gas flow passageway, means for introducing cooling air into the upstream ends of said flow spaces between said shells, and a common annular outlet for discharging such cooling air from the downstream ends of said flow spaces into said discharge nozzle.

3. Apparatus as set forth in claim 1, wherein the power plant includes a compressor, and a conduit communicating with the discharge thereof and with the lateral inlet of the annular passage to abstract air from said compressor for supply to the network of cooling air passages between the outer and inner corrugated shells of the afterburner.

4. Apparatus as set forth in claim 1, wherein variable area nozzle means is carried by the outer corrugated shell for cooperation with the jet nozzle formed in the inner corrugated shell to control the motive gas jet characteristics at a point downstream of the outlet of the network of cooling passages between said shells.

5. Apparatus as set forth in claim 4, wherein the corrugated shells are tapered inwardly in the region of the jet nozzle, the variable area nozzle means being carried by the tapered portion of the outer shell and being limited in radial extent to lie within the maximum lateral dimensions of the engine envelope.

6. Combustion apparatus comprising double corrugated cylindrical shell structure having a first and a second wall in mutually telescoping relation, said first wall having longitudinal corrugations extending through less than the entire length thereof, said first wall having smooth annular opposite end portions into which said longitudinal corrugations are gradually merged, said second wall having annular circumferential corrugations formed throughout the major extent thereof, said second wall terminating in smooth annular opposite end portions, securing means for locking together the abutting surfaces of said first and second shells at a plurality of the points of crossing of the respective corrugations thereof, the smooth annular end portions at adjacent ends of said first and second walls being spaced apart, and means for conducting cooling fluid between said walls.

References Cited in the file of this patent

UNITED STATES PATENTS

| | | |
|---|---|---|
| 710,130 | Weiss | Sept. 30, 1902 |
| 942,466 | Schnuerer | Dec. 7, 1909 |
| 1,330,316 | Hall | Feb. 10, 1920 |
| 1,625,061 | Trout | Apr. 19, 1927 |
| 2,374,609 | McCollum | Apr. 24, 1945 |
| 2,446,059 | Peterson et al. | July 27, 1948 |
| 2,591,676 | Clayton | Apr. 8, 1952 |
| 2,640,317 | Fentress | June 2, 1953 |
| 2,672,728 | Stockdale | Mar. 23, 1954 |